United States Patent

Fauteux et al.

[11] Patent Number: 6,063,520
[45] Date of Patent: May 16, 2000

[54] LIGHTWEIGHT BATTERY CONTAINER AND METHOD FOR FABRICATION OF SAME

[75] Inventors: Denis G. Fauteux, Acton; Robert Rounds, III, Boston, both of Mass.

[73] Assignee: Mitsubishi Chemical Corporation, Japan

[21] Appl. No.: 08/816,212

[22] Filed: Mar. 12, 1997

Related U.S. Application Data

[60] Provisional application No. 60/015,372, Apr. 12, 1996.

[51] Int. Cl.[7] .................................................. H01M 2/00
[52] U.S. Cl. ................................ 429/163; 429/179
[58] Field of Search ............................ 429/163, 177, 429/96, 97

[56] References Cited

U.S. PATENT DOCUMENTS

| | | | |
|---|---|---|---|
| 1,981,533 | 11/1934 | Williams | 175/315 |
| 4,186,246 | 1/1980 | Sugalski | 429/60 |
| 4,278,744 | 7/1981 | Athearn | 429/181 |
| 4,374,186 | 2/1983 | McCartney et al. | 429/154 |
| 4,409,304 | 10/1983 | Gerard et al. | 429/158 |
| 4,582,767 | 4/1986 | Morioka et al. | 429/121 |
| 4,889,777 | 12/1989 | Akuto | 429/162 |
| 5,134,046 | 7/1992 | Chow et al. | 429/176 |
| 5,326,653 | 7/1994 | Chang | 429/162 |
| 5,374,490 | 12/1994 | Aldecoa | 429/152 |
| 5,401,595 | 3/1995 | Kagawa et al. | 429/152 |
| 5,432,017 | 7/1995 | Hassemer et al. | 429/4 |
| 5,445,906 | 8/1995 | Hobson et al. | 429/162 |
| 5,503,948 | 4/1996 | MacKay et al. | 429/152 |
| 5,621,618 | 4/1997 | Komiyama | 361/732 |
| 5,704,803 | 1/1998 | Oshima et al. | 439/500 |
| 5,744,261 | 4/1998 | Muffoletto et al. | 429/131 |

*Primary Examiner*—Kathryn Gorgos
*Assistant Examiner*—Erica Smith-Hicks
*Attorney, Agent, or Firm*—Factor & Partners, LLC

[57] ABSTRACT

A container for electrolytic cells, and an electrolytic cell associated with such a container. The container includes at least two container half members attachable to each other in a mating configuration. At least one barrier member defines a cell containing region within the container. Furthermore, a cover member, in combination with an adjacent barrier member, defines a lead housing region. Electrolytic cells, such as stacks of conventional flat battery cells, have a portion positioned within the cell containing region, while the portion of the electrolytic cells having electrically exposed leads are entrapped in electrically conducting contact with each other and another electrical lead associated with the cover member, in the lead housing region. The electrical lead associated with the cover member has a portion which extends externally to the container, so as to enable electrical contact with an external device.

18 Claims, 2 Drawing Sheets

LIGHTWEIGHT BATTERY CONTAINER AND METHOD FOR FABRICATION OF SAME

The present application depends from and claims priority of Provisional Application Ser. No. 60/015,372, filed Apr. 12, 1996.

BACKGROUND OF THE INVENTION

1. The Field of the Invention

The present invention is directed to a container/casing for a battery, and, more particularly, a lightweight container for use in cooperation with relatively flat stackable cells therewithin. It is contemplated that the cells comprise rechargeable lithium ion cells with a polymer based electrolyte, or, alternatively, with a liquid electrolyte of a composition known in the art.

2. The Prior Art

Lithium ion rechargeable batteries for use in numerous applications, including consumer available devices, are well known in the art. Indeed, such lithium batteries are desirable over other conventional rechargeable batteries (e.g., nickel cadmium, nickel metal hydride) due to their lighter weight, high energy density and overall efficiency, among other things.

Although lithium batteries are relatively light, it is typically desirable to have as light a battery as possible— without, of course, sacrificing any significant operational attributes of the battery. At present, current lithium ion batteries having the necessary capacity and cyclability for use in devices such as portable telephones and notebook/lap-top computers, among others, are fabricated with a liquid electrolyte. While lithium batteries fabricated with a polymer based electrolyte are known in the art, their use in applications requiring relatively high capacities and cyclabilities have not been implemented due to a lack of desired conductivity and other electrical properties, as well as the lack of a means for encasing such a battery.

When using a liquid electrolyte, it is necessary that the battery casing be constructed of a rather rigid and, accordingly, a relatively heavy material. Furthermore, the casings are typically nickel plated steel so as to reduce the likelihood of corrosion, and are rigid so as to help preclude buckling of the casing caused from internal pressures. In addition to the casing, the conventional rechargeable lithium batteries require spring plates which not only add weight to the battery, but which take up valuable volume within the cell which could otherwise be occupied by the other internal components (electrodes and electrolyte) toward yet additional capacity. Furthermore, the fabrication of such batteries is relatively expensive and each application requires specific, relatively complicated configurations for the outer casing, as well as for the internal components.

SUMMARY OF THE INVENTION

The present invention is directed to a container apparatus for electrolytic cells comprising at least first and second half members which are attachable to each other in a mating configuration. At least one barrier member extends from an inner surface of the first and/or second container half members, and is configured to have at least a portion extend toward the other one of the container half members when in their mating configuration. The barrier members define a cell containing region when the container half members are in their mating configuration.

At least one cover member is associated with at least one of the first and second container half members, and is positionable, relative to an adjacent barrier member, to a lead covering position, and, in turn, defining a lead housing region between the barrier member and the cover member. Accordingly, after positioning of a portion of at least one electrolytic cell (such as a flat electrolytic cell), the cell containing region, and positioning of the at least first and second container half members in their mating configuration, a portion of the electrolytic cell(s) become entrapped within the lead housing region, and, in turn, at least a portion of a cell lead associated with the electrolytic cell(s) is/are positioned within the lead housing region.

In a preferred embodiment of the invention, the cover member is hingedly attached to the associated container half member. In addition, at least one container lead having a portion disposed within the lead housing region, and another portion positioned external to the at least first and second container half members, such that the portion within the lead housing region is an electrically conducting contact with the at least one cell lead, is entrapped within the lead housing region.

In another preferred embodiment of the invention, the container apparatus includes at least one container lead which is provided with a thermally frangible portion defining an in-line fuse. In such a preferred embodiment, the container lead is attached to an associated cover member.

Although a single electrolytic cell, such as conventionally known flat battery cell having exposed leads is contemplated for use and as part of the present invention, it is also contemplated that a multiplicity of stacked flat battery cells be used in or as part of the present invention.

The present invention also contemplates a method for fabricating an electrolytic cell container (as well as an electrolytic cell and container apparatus), comprising the steps of: a) providing first and second container half members, capable of being positioned in a mating configuration; b) forming at least one barrier member on at least one of the container half members, emanating from an inner surface thereof, for defining a cell containing region, when the container half members are placed in a mating configuration; c) associating at least one cover member with at least one of the container half members, externally to the cell containing region, to, in turn, define a lead housing region between at least one cover member and an adjacent at least one barrier member; and d) sealing the at least first and second container half members into their mating configuration.

In an alternative embodiment of the invention, at least a portion of one electrolytic cell is inserted into the cell containing region, and at least a portion of the associated electrically conducting lead(s), of the electrolytic cell(s) is/are entrapped within the lead housing region.

BEST MODE FOR CARRYING OUT THE INVENTION

Figure 1:
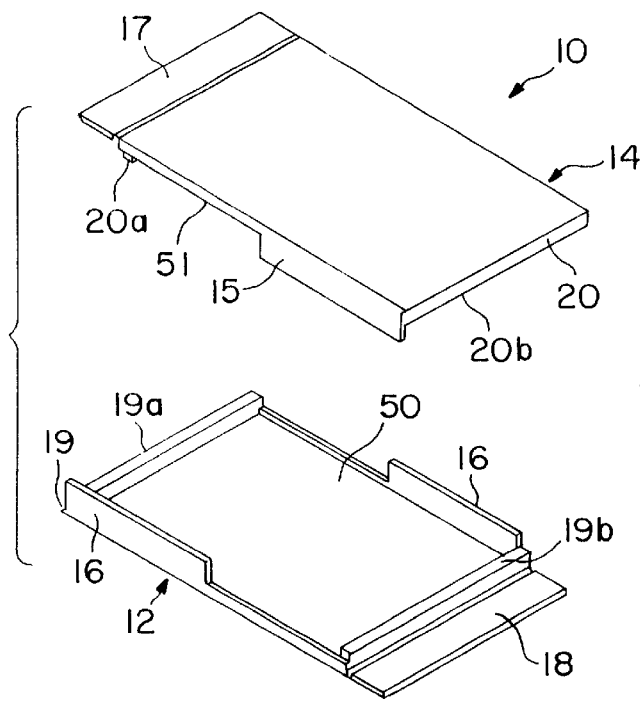
FIG. 1 is a perspective exploded view of the present invention.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

The present invention comprises an electrolytic cell, such as a rechargeable lithium ion battery, and an associated container, wherein the container is relatively light and capable for use with a liquid or polymer electrolyte battery cell.

Specifically, and as shown in FIG. 1 of the drawings, the invention comprises container 10 having first and second container half members 12 and 14, respectively. Each half includes side walls 15 and 16 which are used as a means to help form a complete enclosure after assembly of the container (See FIG. 2). Each of the halves include a hingedly attached cover member 17, 18, foldable into abutment with corresponding edges 19, 20 of opposite first and second container half members 12 and 14, respectively.

Figure 3:
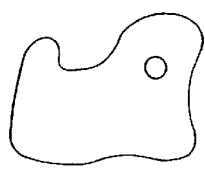
FIG. 3 is a top plan view of an alternative configuration of the present invention.
Figure 4:
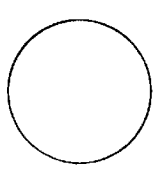
FIG. 4 is a top plan view of a further alternative configuration of the present invention.
Figure 10:
FIG. 10 is a side cross-sectional view of a battery employing a container such as illustrated in FIG. 1, having a plurality of cells, showing the joining of the cell leads.

Although the container is shown in FIG. 1 as having a substantially rectangular configuration of a particular depth, it will be understood that an infinite number of various configurations and depths are likewise contemplated—depending on the desired application and positioning within a particular device. Examples of some other container configurations are shown in FIGS. 3 and 4. Additionally, fabrication of the container may be accomplished through conventional manufacturing processes. Furthermore, the material for the container may comprise any conventional material which will not become damaged upon exposure to the specific components/materials which will be in physical contact with the container. Examples of such acceptable materials include plastics, such as polypropylene. Also, although cover members are shown as being hingedly attached to associated cover half members, it is also contemplated that such cover members be attached by other means, as well as being integrally attached as part of the cover member itself (as shown in FIGS. 3 and 4).

Figure 7:
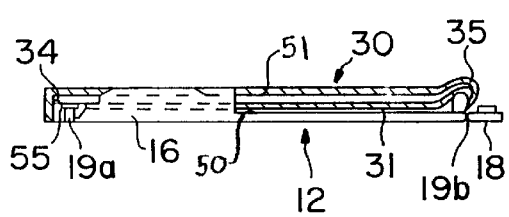
FIG. 7 is a side cross-sectional view of the present invention.

As shown in FIG. 1, first container half 12 includes barrier members 19a and 19b, and second container half 14 includes barrier members 20a and 20b. These barrier members serve to define cell containing region 50, 51 when the container halves are in their mated configurations. The barrier members, in combination with an adjacently positioned cover member, serve to define a lead housing region, such as lead housing region 55 as shown in FIG. 7.

Figure 11:
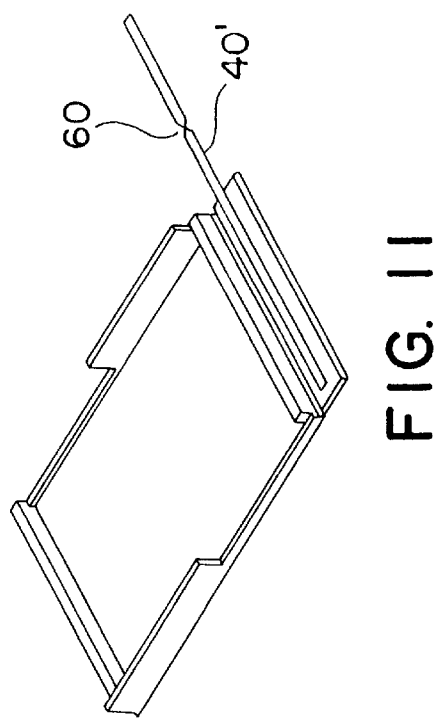
FIG. 11 is a further perspective view of one half of a container showing placement of a container lead, according to an alternative embodiment of the invention, wherein the container lead is provided with an in-line fuse.
Figure 9:
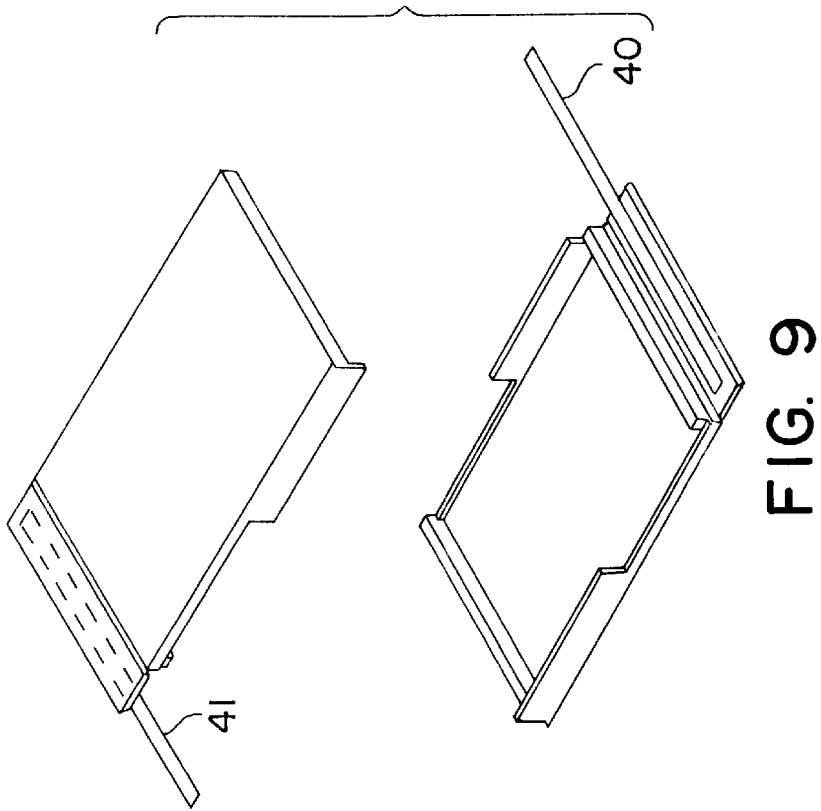
FIG. 9 is a perspective exploded view of the container of FIG. 1, showing placement of the container leads.

Cover leads 40 and 41 are each shown in FIG. 9 as being attached to a cover member. As will be explained, these cover leads will be in electrically conducting contact with the cell leads, such as cell leads 34 and 35 (FIG. 7), within lead housing region, while a portion of the cell leads will extend externally to container 10—for electrical contact with an external device. An alternative cell lead 40' is shown in FIG. 11, wherein the lead is configured to include an in-line fuse 60.

Again, keeping in mind that the present drawings merely disclose only a few of the infinite possibilities of container and cell configurations, further explanation relative to the method for fabricating the battery and associated container will now be described—with respect to the use of relatively flat stackable cells.

Figure 5:
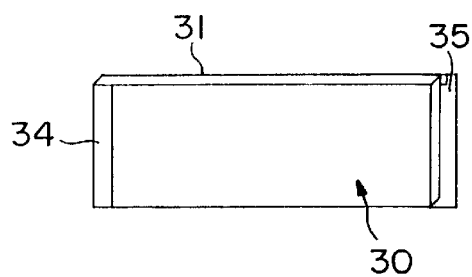
FIG. 5 is a perspective view of a flat cell for use in conjunction with the present invention.
Figure 6:
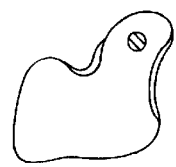
FIG. 6 is a plan view of a stackable cell having a configuration corresponding to the container of FIG. 3.

Specifically, relatively flat stackable cells 30, 31 are shown in FIGS. 5 and 6 as being constructed with two electrodes and an electrolyte (not shown), such as a polymer electrolyte. Stackable cells 30, 31 include positive and negative electrodes (not shown) and associated exposed positive and negative electrical leads 34, 35, respectively. As explained, the particular shape of each stackable cell is dependent on the particular container configuration to be used. Accordingly, the cells can be die-cut, for example, into the appropriate shape. As seen in FIG. 7, a portion of the cells are positioned within cell containing region 50, 51, while the portion of the cells with the electrical leads are entrapped within corresponding lead housing regions, such as lead housing region 55. After the cell(s) is/are placed into the container, the ends of the cells, and, more particularly, the exposed electrical leads, are folded over the corresponding barrier members (such as barrier members 19a and 19b). Inasmuch as each cell has a known capacity, the number of cells to be stacked together (with their respective electrical leads adjacent each other) is easily determined by the desired capacity of the entire fabricated battery. Indeed, the only limitation on stackability would be as a result of the particular dimensional configuration of the container itself.

Figure 2:
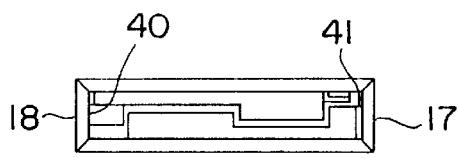
FIG. 2 is a side elevation of the present invention.
Figure 8:
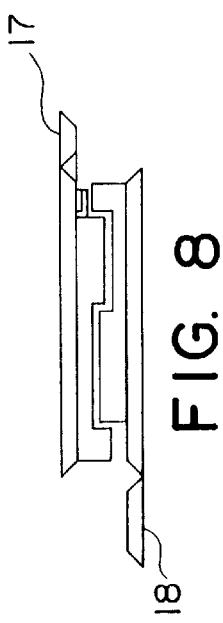
FIG. 8 is a side elevation of the present invention prior to completed assembly.

After the desired amount of individual cells are stacked, each of the adjacently positioned electrical leads are folded over the adjacent barrier members of the corresponding container half member (e.g., negative electrical leads 35 over barrier member 19b, and positive electrical leads 34 over barrier member 19a—of course both positive and negative electrical leads may be adjacent the same barrier member when the cells are constructed in, for example, series, such as in a 7.2 volt system. Next, the two container half members 12 and 14 (FIG. 1) of container 10 are positioned and aligned into a cell encasing orientation, as shown in FIG. 2 and FIG. 8. Once properly positioned, cover members 17 and 18 are folded toward an adjacent barrier member of the other container half member, until such cover members come into contact with the exposed electrical leads of the cells, and, in turn, entrap the electrical leads of the cells within the lead housing region. Inasmuch as in a preferred embodiment, each of the cover members have a corresponding container lead 40, 41 (FIG. 9) attached thereto, such leads will be forced into electrical contact with the exposed electrical leads of each of the cells which have been folded over the respective barrier members.

After the cover members are folded into contact with the electrical leads of the cells, the two halves of the container will be secured together through any number of ways including, but not limited to, welding, adhesive, snap fit etc. Additionally, securement can also occur through use of a secondary casing or even by wrapping a label around the container. Use of a secondary casing provides the ability to manufacture batteries with only a few different type of "primary case" sizes and dimensions—toward facilitating standardization thereof. Accordingly, such standardized primary cased cells can then be used in "secondary casings" which have had their configurations altered to correspond to the specific battery compartment/location within the particular device of choice. Furthermore, as previously explained, cover leads 40, 41, which are attached to the cover members of the container halves, may extend externally to the container for operative connection to the device in which the "battery pack" will be used.

The present invention also contemplates that leads 40, 41 of the fabricated cell, be configured at any desired location or orientation—depending on the specific application of use. Indeed, the positioning of the leads can be altered externally of the container as well as within the container. Furthermore, it is also contemplated that the leads, such as external leads 40, 41, be cut in such a manner so as to result in an in-line fuse 60 (see FIG. 11)—especially inasmuch as the leads are contemplated to be made from a relatively thin flexible material (as are the leads for the individual stackable cells).

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A container apparatus for electrolytic cells having at least two electrically conducting leads comprising:
    at least first and second container half members attachable to each other in a mating configuration,
    at least one barrier member extending from an inner surface of at least one of the at least first and second container half members, and configured to have at least a portion extend toward the other of the at least first and second container half members when in their mating configuration,
    the at least one barrier member defining a cell containing region, when the at least first and second container half members are in their mating configuration,
    at least one cover member hingedly associated with at least one of the at least first and second container half members, and positionable, relative to the at least one barrier member, to a lead covering position, and, in turn, defining a lead housing region between the at least one barrier member and the at least one cover member,
    whereupon positioning of a portion of at least one electrolytic cell within the cell containing region, and positioning of the at least first and second container half members in the mating configuration, a portion of the at least two electrically conducting leads of the at least one electrolytic cell extend over the barrier member and become entrapped within the lead housing region, and, in turn, at least a portion of the at least two electrically conducting leads of the at least one electrolytic cell being positioned within the lead housing region.

2. The container apparatus according to claim 1, further comprising:
    at least one container lead having a portion disposed within the lead housing region and another portion positioned external to the at least first and second container half members, such that the portion within the lead housing region is in electrically conducting contact with the at least one cell lead, of such an at least one electrolytic cell, entrapped within the lead housing region.

3. The container apparatus according to claim 2, wherein the at least one container lead is provided with a thermally frangible portion defining an in-line fuse.

4. The container apparatus according to claim 2, wherein the at least one container lead is attached to an associated cover member.

5. The container apparatus according to claim 1, wherein at least one of the at least first and second container half members is fabricated from a plastic material.

6. An electrolytic cell and associated container apparatus comprising:
    at least first and second container half members attachable to each other in a mating configuration,
    at least one barrier member extending from an inner surface of at least one of the at least first and second container half members, and configured to have at least a portion extend toward the other of the at least first and second container half members when in their mating configuration,
    the at least one barrier member defining a cell containing region, when the at least first and second container half members are in their mating configuration,
    at least one electrolytic cell having an electrically conducting lead, having a portion within the cell containing region,
    at least one cover member hingedly associated with at least one of the at least first and second container half members, and positionable, relative to the at least one barrier member, to a lead covering position, and, in turn, defining a lead housing region between the at least one barrier member and the at least one cover member,
    whereupon positioning of the portion of the at least one electrolytic cell within the cell containing region, and positioning of the at least first and second container half members in the mating configuration, at least a portion of the electrically conducting lead of the at least one electrolytic cell extends over the barrier member and becomes entrapped within the lead housing region upon hinged rotation of the at least one cover member.

7. The electrolytic cell and associated container apparatus according to claim 6, further comprising:
    at least one container lead having a portion disposed within the lead housing region and another portion positioned external to the at least first and second container half members, such that the portion of the at least one container lead within the lead housing region is in electrically conducting contact with the electrically conducting lead of the at least one electrolytic cell entrapped within the lead housing region.

8. The electrolytic cell and associated container apparatus according to claim 7, wherein the at least one container lead is provided with a thermally frangible portion defining an in-line fuse.

9. The electrolytic cell and associated container apparatus according to claim 7, wherein the at least one container lead is attached to an associated cover member.

10. The electrolytic cell and associated container apparatus according to claim 6, wherein at least one of the at least first and second container half members is fabricated from a plastic material.

11. A method for fabricating an electrolytic cell container apparatus comprising the steps of:
    providing at least first and second container half members, capable of being positioned in a mating configuration;
    forming at least one barrier member on at least one of the container half members, emanating from an inner surface thereof, for defining a cell containing region, when the container half members are placed in the mating configuration;

hingedly associating at least one cover member with at least one of the container half members, externally to the cell containing region, to, in turn, define a lead housing region between the at least one hingedly associated cover member and the associated at least one barrier member, when at least a portion of at least one electrolytic cell is positioned within the cell containing region, a portion of the electrically conductive lead of the electrolytic cell extends over the at least one barrier, and in turn, becomes entrapped within the lead housing region; and sealing the at least first and second container half members into their mated configuration, to retain the electrically conductive lead within the lead housing region.

12. The method of fabricating an electrolytic cell container according to claim 11 further comprising the steps of positioning a portion of at least one container lead within the lead housing region, and, having at least another portion positioned external to the at least first and second container half members.

13. The method of fabricating an electrolytic cell container according to claim 12 wherein the step of positioning a portion of at least one container lead comprises the step of attaching the container lead to an associated cover member.

14. The method for fabricating an electrolytic cell container according to claim 11, further comprising the step of forming at least one of the container half members from a plastic material.

15. A method for fabricating an electrolytic cell and associated container comprising the steps of:

providing at least first and second container half members, capable of being positioned in a mating configuration;

forming at least one barrier member on at least one of the container half members, emanating from an inner surface thereof, for defining a cell containing region, when the container half members are placed in the mating configuration;

hingedly associating at least one cover member with at least one of the container half members, externally to the cell containing region, to, in turn, define a lead housing region between the at least one hingedly associated cover member and the associated at least one barrier member;

inserting a portion of at least one electrolytic cell, having an electrically conducting lead, into the cell containing region;

extending at least a portion of the electrically conducting lead over the at least one barrier member;

entrapping at least a portion of the electrically conducting lead within the lead housing region; and sealing the at least first and second container half members into their mated configuration to retain the electrically conductive lead within the lead housing region.

16. The method of fabricating an electrolytic cell and associated container according to claim 15 further comprising the steps of positioning a portion of at least one container lead within the lead housing region, and, having at least another portion positioned external to the at least first and second container half members.

17. The method for fabricating an electrolytic cell and associated container according to claim 15 wherein the step of positioning a portion of at least one container lead comprises attaching the container lead to an associated cover member.

18. The method for fabricating an electrolytic cell and associated container according to claim 15, further comprising the step of forming at least one of the container half members from a plastic material.

* * * * *